United States Patent

Fabiano, Jr. et al.

[15] 3,647,980

[45] Mar. 7, 1972

[54] SWITCHING NETWORK CONTROL WITHOUT NETWORK MAP

[72] Inventors: Lucian Philip Fabiano, Jr., Denver, Colo.; John Paul Grandmaison, Sudbury, Mass.; William Wallace Greason, III, Longmount; Ted R. King, Jr., Broomfield, both of Colo.

[73] Assignee: Bell Telephone Laboratories, Incorporated, Murray Hill, N.J.

[22] Filed: May 7, 1970

[21] Appl. No.: 35,434

[52] U.S. Cl. ..........................179/18 ES, 179/18 GE, 179/99

[51] Int. Cl. ..........................H04q 3/54

[58] Field of Search ..................179/99, 18 ES, 18 EA, 18 E, 179/18 GE, 22, 16 EC

[56] References Cited

UNITED STATES PATENTS

| | | | |
|---|---|---|---|
| 3,519,755 | 7/1970 | Allum et al. | 179/18 HA |
| 3,423,539 | 1/1969 | Page et al. | 179/18 E |
| 3,309,467 | 3/1967 | Gorgas et al. | 179/18 EA |

*Primary Examiner*—Kathleen H. Claffy
*Assistant Examiner*—Thomas W. Brown
*Attorney*—R. J. Guenther and James Warren Falk

[57] ABSTRACT

A key telephone system is disclosed in which switching functions are carried out in a central switching network instead of at the telephone set to reduce the amount of cabling in the system. The network is controlled by a central processor without requiring a network map in memory. The network contains fewer cross-points than the product of the number of stations and lines and means are provided to select a special trunk when an attempt is made to operate a nonexistent cross-point at the "intersection" of the desired station and line.

14 Claims, 9 Drawing Figures

INVENTORS
L. P. FABIANO, JR.
J. P. GRANDMAISON
W. W. GREASON, III
T. R. KING, JR.
BY Howard R. Popper
ATTORNEY Patented March 7, 1972 3,647,980

7 Sheets-Sheet 4

STATION TRANSLATION BYTES

STATION ACTIVITY

PRIMARY LINE STORE

PROCESSOR 300 UPDATE AND DATA LOGIC

SWITCHING NETWORK CONTROL WITHOUT NETWORK MAP

BACKGROUND OF THE INVENTION

This invention relates to electronic key telephone systems and more particularly to systems having a centralized switching network which dispenses with the need to cable line appearances directly to the station set.

The key telephone switching art is searching for a solution to the problem of excessive costs in initial installation and subsequent modifications. Studies show the first year cost of installing new key telephone equipment of the conventional type is a large portion of the initial capital cost of the apparatus itself. Subsequent rearrangement costs also constitute a large percentage of the original apparatus cost per year. These labor costs arise because the station wiring must be changed whenever a new line or service is added or dropped or when the physical location of the station set is moved.

Several different approaches have been taken to reduce the costs of providing key telephone system service. In the copending application of D. J. H. Knollman, Ser. No. 726,062, filed May 2, 1968, now U.S. Pat. No. 3,549,820 issued Dec. 22, 1970 an important contribution is made to reduce the cabling required for each set by providing only one tip and ring lead and a pair of data input and data output leads to each station set regardless of the number of lines for which the set is to have "pickup" access. In the Knollman arrangement, rewiring at the station set is obviated because the function of each key button is assigned in a central memory rather than by special wiring at the station set. Other improvements in the key telephone system art are disclosed in the copending applications of H. P. Anderson, M. A. Flavin, J. P. Grandmaison, G. E. Saltus, J. L. Simon, Ser. No. 709,585, filed Feb. 27, 1968, now U.S. Pat. No. 3,519,757 issued July 7, 1970 and D. C. Opferman, Ser. No. 844,913, filed July 25, 1969, now U.S. Pat. No. 3,604,857 issued Sept. 14, 1971. While all of the foregoing systems make various attempts at controlling a remote switching network so that the station is saved the switching function, the networks are required to be controlled by apparatus which is nevertheless somewhat more complex than may be desired in certain size systems, all of which may become uneconomical in systems below a certain size.

Accordingly, it is desired to provide a key telephone switching system which contains a centrally located switching network for interconnecting the lines and stations in the system without the need of an unduly complex central control apparatus.

STATEMENT OF THE INVENTION

In accordance with our invention, a switching network containing fewer cross points than the product of the number of stations and lines may be provided. To effect a connection between a station and a line for which no such cross point exists in the network, a group of special "trunks" are provided. Each such trunk has a cross point connected to each line appearance in the network and a cross point connected to each station appearance in the system. A request for a trunk is generated when the central processor, upon scanning the station and after attempting to operate a nonexistent direct network cross point between that station and some line, detects that the station has not been connected through the network. Further, in accordance with the invention the same check for the network connection is made after the request for the trunk connection. The request for such a trunk may be repeated each time the station is processed until a trunk becomes available to complete the connection or until the request is abandoned. In this manner, no "network map" need be retained in memory to indicate where direct cross points are actually provided between specific lines and stations thereby reducing the cost of the memory required by the central processor. Further, a specific special trunk need not be requested since the same procedure may be followed.

DESCRIPTION OF THE DRAWING

The foregoing and other objects and features may become more apparent in the light of the ensuing description when read together with the drawing, in which.

GENERAL DESCRIPTION

Figure 1:
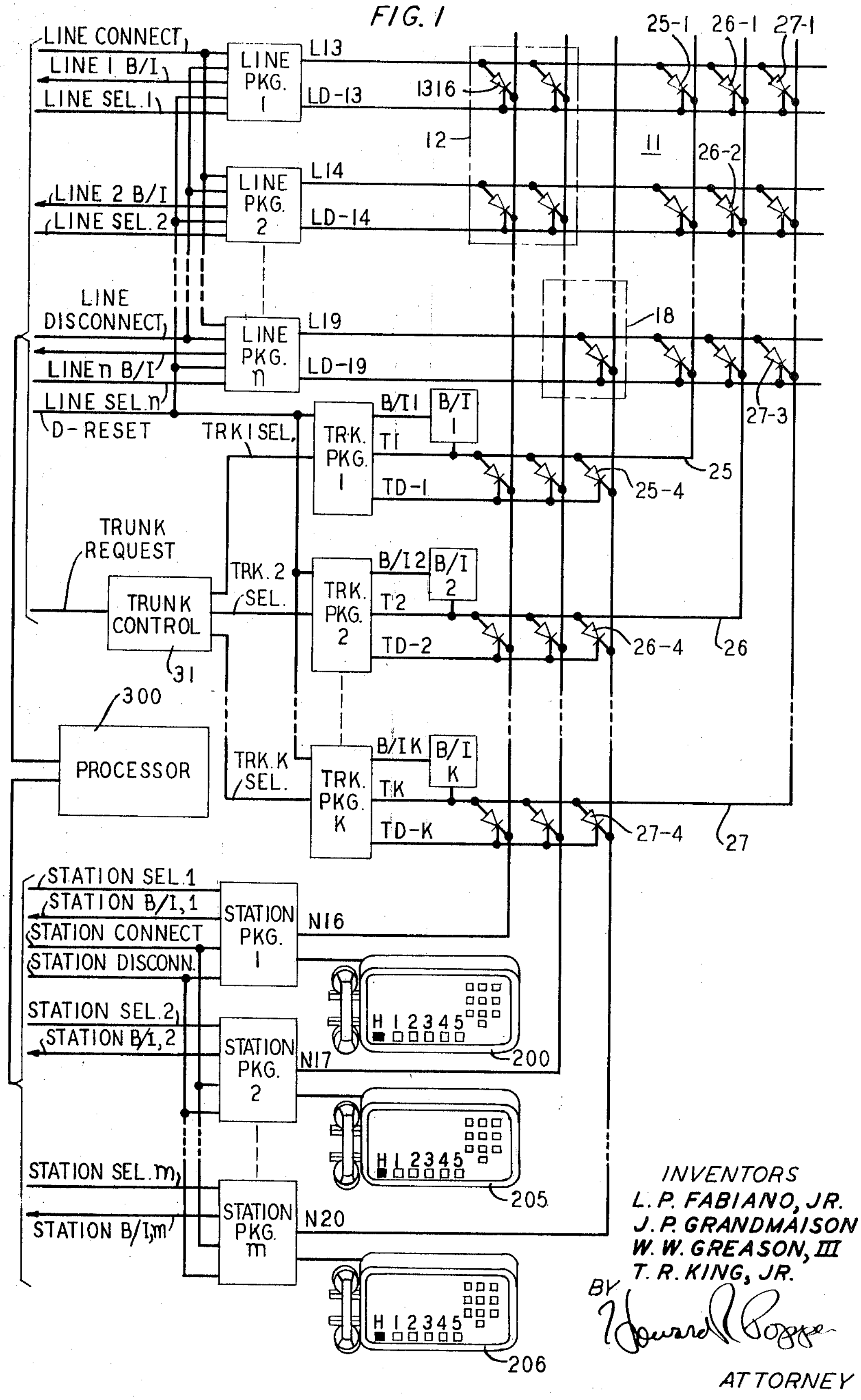
FIG. 1 shows a block diagram of an electronic key telephone system arrangement according to the present invention.

Referring now to FIG. 1, there is shown a simplified schematic representation of the key telephone switching system of the present invention. The arrangement comprises a switching network 11 containing semiconductor cross points which advantageously may be of thyristors of shorted-emitter design in which there is present, effectively, a resistor from the gate element to the emitter element to improve controllability of the device parameters. A more complete discussion of such devices, which are a variety of PNPN triodes, may be found in F. E. Gentry, *Semiconductor Controlled Rectifiers*, Prentice Hall, 1964 at page 138 et seq.

Monolithic, integrated arrays of thyristor cross points may be coupled on ceramic substrates to obtain a unit building block array of any desired dimension. In network 11, one such group of cross points is depicted at 12 and provides for establishing interconnections between line L13 associated with line package 1 and conductor N16 associated with station package 1 serving station set 200. Also, line L14 associated with line package 2 may be connected through a cross point of group 12 with conductor N17 associated with station package 2 serving station set 205.

For simplicity, only a representative number of telephone lines, stations and cross points in network 11 have been shown. While the lines L13 and L14 may be connected to station sets 200 and 205 through different combinations of the direct cross points in substrate group 12, there will be some lines and stations for which no direct cross point is available in network 11. In FIG. 1, for example, telephone stations 200, 205, and 206 may be thought of as belonging to one telephone customer. Stations 200 and 205 will have nonblocking access to lines L13 and L14 via cross point substrate group 12. Station 206 will have nonblocking access to line L19 via cross point substrate group 18. However, stations 200 and 205 are not provided with any direct cross point in network 11 for communicating with line L19. However, since these stations belong to the same customer, the need may arise for at least one of them to be given access to line L19. Similarly, lines L13 and L14 may desire to communicate with station 206 for which no direct cross point path is provided.

While, theoretically, a direct thyristor cross point could be especially provided to interconnect these last-mentioned lines and stations on a custom installation basis, it is deemed inefficient to tamper with the substrates constituting network 11. Further, it is desired that network 11 contain a plurality of cross point substrates arranged along a principal diagonal of the network where each such substrate group such as 12 and 18 provides for interconnecting among a particular group of lines and stations. Accordingly, once the assignment of such substrates 12 and 18 has initially been made as, for example, among consecutively numbered groups of lines and stations, no cross point is available to effect a connection between one of these stations and a nonconsecutively numbered line that may be associated with a different cross point substrate group. However, in accordance with an aspect of our invention, network 11 is equipped with a limited number of two-stage cross point trunk paths 25, 26, and 27. To connect line L13, for example, to station 206 for which cross point substrate group 12 provides no direct path, one of the thyristors 25–1, 26–1 or 27–1 at the intersection of any of trunk paths 25, 26, and 27 with line L13 may be fired together with one of the companion thyristors 25–4, 26–4 or 27–4 at the intersection of the last-mentioned paths with conductor N20 associated with station 206. Similarly, if line 14 required access to station 206 the connection might be effected by means of thyristors 26–2 and 26–4 of trunk path 26.

Ordinarily, the control of the cross points of a switching network such as network 11 by a call processing apparatus would necessitate that the memory unit of such apparatus contain status information concerning which lines were directly connectable to which stations and status information concerning which of trunk paths 25, 26 or 27 was available to be used in the event that a direct connection path was not provided by means of one of the cross point substrate groups such as 12 or 18. The first of these items of stored information is commonly referred to as a network map and the second would be called the busy-idle record for such trunk circuit paths. In accordance with the present invention, however, neither such a network map of available direct cross points nor a busy-idle record of alternate trunk paths need be stored in memory. The logic circuitry of central processor 300 of the present invention shown in FIG. 2A and more particularly in FIG. 3, when instructed to effect an interconnection between a line and a station, will apply a line connect and a line select signal to the line package of the designated line such as line package 1 for line L13 and a station select and station connect signal to the station package of the designated station such as station package 1 for station set 200. If a cross point is in fact provided in network 11, the cross point will fire and the station package mark monitor will cause a signal indicating success to be sent back to processor 300, as discussed below. However, if no direct cross point exists in network 11, the mark monitor signal will be absent. When, under these circumstances, the mark monitor signal is not provided by the station package, processor 300 applies a signal on the trunk request lead to trunk control circuit 31. Trunk control circuit 31 selects one of trunk packages 1 through K and if the selected trunk package is available (i.e., idle), a path will be completed through the associated one of trunk paths 25, 26, or 27.

DETAILED DESCRIPTION OF FIGS. 2A–2B

Figure 2A:
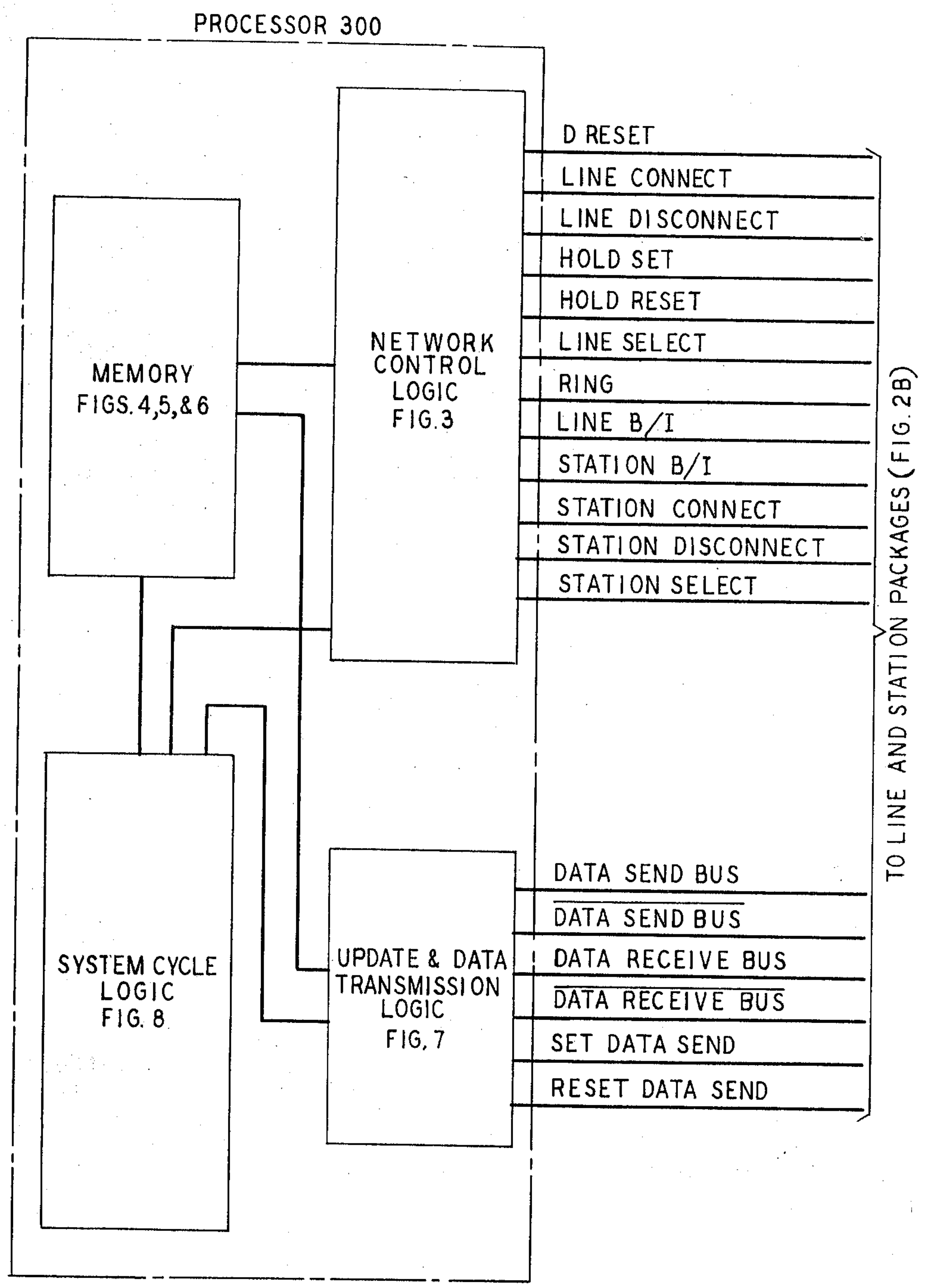
FIG. 2A shows a block diagram of the processor of the arrangement of FIG. 1.
Figure 2B:
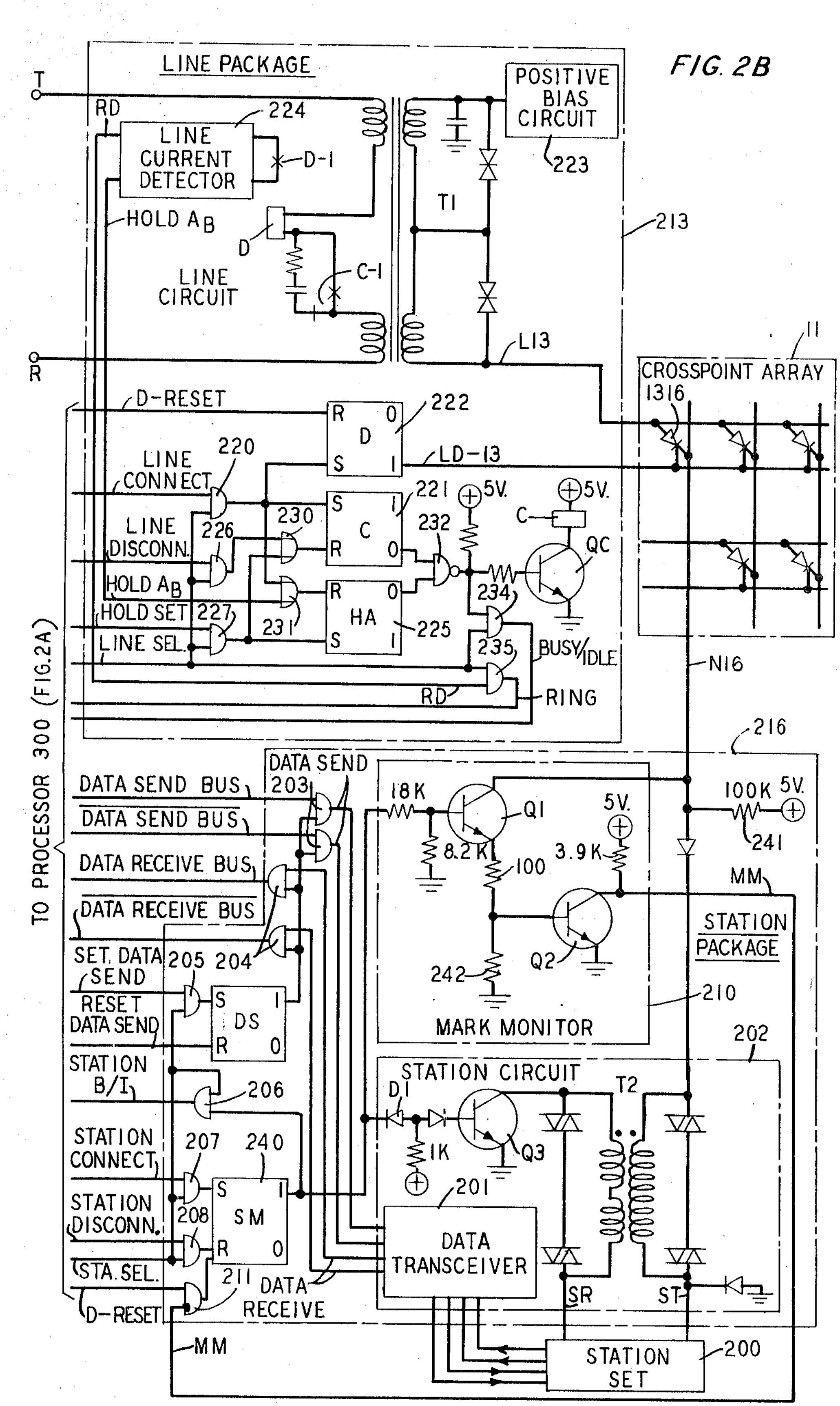
FIG. 2B shows details of an illustrative line package, station package and network connection in the embodiment of FIG. 1.

The details of an illustrative one of line packages 1–*n* of FIG. 1 and of an illustrative one of the station packages 1–*m* of FIG. 1 are shown in FIG. 2B at 213 and 216, respectively. In addition, an illustrative station set 200 is shown at the bottom of the figure connected to station package 216. Each such station set is provided with three pairs of leads as in the above-mentioned copending Knollman application. A pair of data input leads and a pair of data output leads connect the station set 200 with a data transceiver 201 in the station circuit portion of the station package 216. The tip and ring talking path leads SR, ST connect the station set to the windings of transformer T2. Only one of the talking conductors, however, N16 is provided with an appearance in network 11.

The station set contains an encoder, not shown, by means of which a coded representation of the identity of any key button operated by the station user is transmitted over to the processor (FIG. 2A) over the data leads via data transceiver 201. Station set 200 also contains a transceiver circuit and register, not shown, by means of which information provided by the processor is converted into signals for illuminating the key buttons at a specific rate as determined by the processor 300 and for operating the station ringer, not shown. As has priorly been described in the above-mentioned copending applications, the transmission of data to and from the station set may be carried on in synchronous fashion, each bit incoming to the set causing a bit of information to be shifted out of the set. The remaining elements in station package 216 will be described later in connection with the description of processor 300 operation.

The illustrative line package 213 comprises a line transformer T1 having its primary windings connected to the tip and ring conductors of a line that may be connected to a central office or PBX. The secondary windings of transformer T1 are connected between a positive bias circuit 223 and a talking appearance lead L13 which the line package presents to cross point array 11. The primary side of the line package includes a line relay D whose winding is connected to monitor the loop current to the remote office. Relay D responds to the presence or absence of loop current and also to the application of ringing current by the remote office. Contact D–1 of relay D signals the various loop circuit conditions to line current detector 224. Line current detector 224 provides at its output leads RD and $HOLDA_B$ indications that are compatible to the type of signals acceptable to processor 300. These signals will be discussed in detail later.

Line package 213 also contains D flip-flop 222, C flip-flop 221, and HA flip-flop 225. C flip-flop 221 is set when a line connect signal and a line select signal is applied by the network logic FIG. 2A of processor 300. When C flip-flop 221 is set, a low signal appears at its "0" output. Simultaneously, with the setting of C flip-flop 221, the line connect and line select signals which activate AND-gate 220 will cause HA flip-flop 225 to be reset via OR-gate 231. With C flip-flop 221 set and HA flip-flop 225 reset, NAND-gate 232 will have its upper input lead in the low signal condition and its lower input lead in the high signal condition causing its output connected to the base of transistor QC to go high. Transistor QC turns on operating relay C. Relay C in operating at its contact C–1 provides a DC bridge to the remote office at the primary of transformer T1. Simultaneously, with the setting of C flip-flop 221, D flip-flop 222 is set. Setting of D flip-flop 222 provides a ground signal on lead LD–13 thereby enabling the gate electrodes of the row of thyristor cross points in network 11 associated with the line L13. Positive bias circuit 223 is in series with secondary winding of transformer T1 connected to line L13. When the gate electrodes of the aforementioned row are activated by the ground signal on lead LD–13 and as hereinafter described, a current sink is provided to one of the cross points by a station package such as station package 216. A talking path connection is established between the line package and the station package through an activated cross point such as cross point 1316. In the normal operation of processor 300, a D reset pulse is now applied resetting the D flip-flop and removing the enabling pulse from lead LD–13.

When processor 300 determines that the network connection between a line and station package is to be broken, it activates the line disconnect lead and the line select lead thereby activating AND-gate 226. AND-gate 226 activated resets C flip-flop 221 through OR-gate 230. Resetting of C flip-flop 221 causes a high signal now to be applied also to the upper input of NAND-gate 232 thereby causing its output which is applied to the base of transistor QC to go low. Transistor QC turns off releasing relay C.

When processor 300 determines that line package 213 is to be placed in the holding condition, it activates the hold set and line select leads thereby activating AND-gate 227. AND-gate 227 sets HA flip-flop 225 an resets C flip-flop 221 through OR-gate 230. Resetting of HA flip-flop 225 causes a high signal to appear at its "0" output which is connected to the lower input of NAND-gate 225. The resetting of C flip-flop 221 provides a high signal at its "0" output which is connected to the upper input of NAND gate 232. Accordingly, the output of NAND-gate 232 is in the high signal condition maintaining transistor QC on and relay C operating. Should the remote office connected to the primary winding of transformer T1 now abandon the call, relay D will release and line current detector 224 detecting this release will apply a signal to lead $HOLDA_B$. The signal on this lead resets HA flip-flop 225 through OR gate 231. HA flip-flop 225 in the reset condition produces a high signal at its "0" output connected to the lower input of NAND-gate 232. At this time, NAND-gate 232 has high signals applied to both of its inputs because C flip-flop 221 and HA flip-flop 225 are both reset. The output of NAND-gate 232 now exhibits the low signal condition causing transistor QC to turn off and to release relay C. Relay C released at its contact C–1 removes the DC connection to the remote office.

In the ensuing description which is concerned with the operations of logic circuit 300, the processor will from time to time be described as "accessing" the line package or station package. When the processor accesses a line package or a station package, it always energizes the line select or station select lead as the case may be. In addition it may activate one of the foregoing line connect, line disconnect or hold set leads or a station connect or a station disconnect lead. In addition the processor will also access the line or station package to ascertain the status of that package. For example, during one phase of its system cycle operation, processor 300 will desire to ascertain the state of line package 213. In one of these circumstances, the line select lead is energized and the C relay is operated or released as has just been described. The state of this relay will be revealed to the processor by signals appearing on the busy/idle lead at the output of AND-gate 234. Simultaneously if the remote office has applied ringing to the primary winding of transformer T1, the RD lead at the output of line current detector 224 will enable AND-gate 235 whose output will reflect the appropriate condition to processor 300 on lead RING.

At this point, it will be helpful to consider the manner in which information is exchanged between central processor 300 and its memory unit. The memory unit comprises a read-only portion containing a translation word, FIG. 4 for every station in the system and a changeable portion containing a station activity word, FIG. 5, for each station and a line activity word, FIG. 6, for every line in the system. The station activity section of memory is used as a scratch store. A station activity word is read from memory each time a translation word is read, and is associated with the corresponding station. Each word is composed of three bytes which define the past history of the station set. The first byte 5–1 labeled Active Line Button indicates the current active line button being used. The second byte 5–2 labeled Active State Button indicates the present active-state button, and the last byte 5–3 labeled Last Received Button indicates the last button state received from the station set for its button groups. It should be noted that the current active line button and the present active-state button are not necessarily the same. This is because the present active-state button may correspond to a service button being applied to the station set's active line. The third byte 5–3 is used to insure that at least two successive identical button states are received before any service actions are performed, and to increase data transmission reliability.

The array of line activity words is called the primary line store. In general, each station set will have buttons for accessing more than one telephone line and the same line may be accessible to more than one station. It would therefore be inefficient to store in each station's memory word the status of every line that the station could access because the line status information would then be repeated in each station's memory word having access to that line. Accordingly, as described in the copending application of L. P. Fabiano, Jr. Case 2, Ser. No. 35,435 filed of even date herewith, the activity of the telephone line is stored just once in memory in the line activity word, FIG. 6, and the line bytes in each station's translation word, FIG. 4, are consulted to obtain the address of the line activity word.

Figure 4:
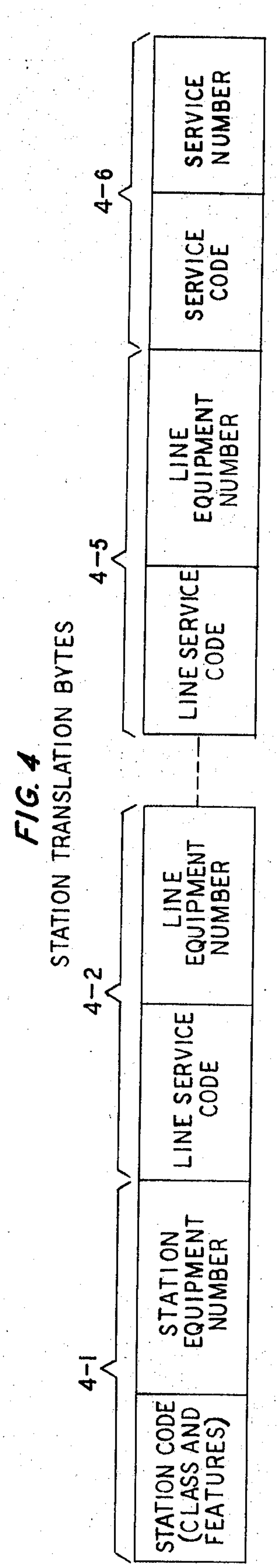
FIGS. 4, 5, and 6 show respectively the station translation, the station activity, and the line activity portions of the processor's memory unit in this specific embodiment.

Assuming that telephone set 200 contains six key buttons which includes one hold button and five key buttons, the station translation word, FIG. 4, will comprise six information bytes. The station byte 4–1 of the station translation word contains the station code and the station equipment number. The station code is a sequence of binary bits which identifies the type of station, i.e., whether the station is a six-button key telephone set, whether it has "I-HOLD" service or any of the other well-known types of station services that customers of key telephone systems find desirable. The station equipment number designates the location of the station's talking path lead N16 in cross point array 11 an identifies to the processor the location of the station package station select lead and transceiver leads.

The five remaining bytes in the station translation word, FIG. 4, each contain two segments and may be line button information bytes or service button information bytes. For a line button information byte, the first segment gives the line service number for the particular line and the second segment gives the line equipment number for that line. The line service number is a coded designation of bits which indicates to the processor the type of line (intercom, delayed ring, normal ring, no ring, etc.). The line equipment number designates the location of the line's appearance in network 11 and also identifies to the processor the location of the line package. On the other hand, for a service button information byte the first segment identifies the particular key button service such as buzzing, exclusion, etc., while the second segment containing the service number is used to carry out the service.

Physically, the station translation words may be arranged in a memory fabricated of multiple diode integrated circuit chips arranged on a printed circuit board, not shown. Each diode in such a memory corresponds to a bit position and the bit could be a "1" or "0" as occasioned by the presence or absence of a dot of conducting paint which connects or leaves unconnected the particular diode in the array. In this manner, the translation memory may constitute a read-only device that can be changed in the field by maintenance personnel. Changes in the assignment of lines that a given station may access or in the services to be accorded a station may thus be changed by altering the diode connections in the station translation memory instead of vast cross-connect fields required in prior art key telephone systems.

PROCESSOR UPDATE AND DATA LOGIC FIG. 7

The station translation word, FIG. 4, for each station in the system is sequentially accessed by central processor 300 logic 7–1. Assume that logic 7–1 reads the station translation word for station 200. The station code and station equipment number are read out and stored in a temporary register, not shown, in the central processor. At the same time, the station activity word (FIG. 5) associated with the station is read from memory and the information therein is transferred to another processor register, not shown. Next, processor logic 7–2 transfers the contents of the first line button or service button byte in the station translation word to another of its internal processing registers, also not shown. The first button on a key button telephone set is normally a hold button for which no translation information is required in memory. Accordingly, the first byte selected by logic 7–2 will correspond normally to the second key button of the station set.

Figure 5:
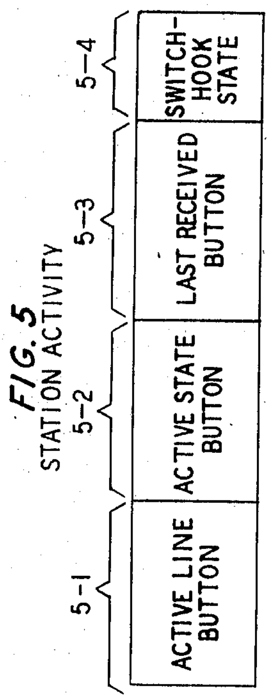
Figure 6:
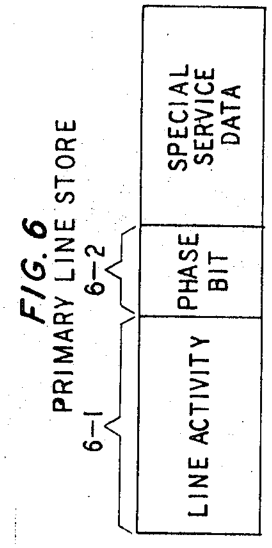

Assuming that, as shown in FIG. 5, the selected byte is line button information byte 4–2 (which corresponds to line L13 associated with line package 213) the line equipment number stored in this byte will be used by logic 7–3 as an address to access the location in the primary line store, FIG. 6, containing the activity word for line L13. Simultaneously, the line equipment number is used by logic 7–3 to access line package 213.

With the information pertaining to the state of station 200 and of the line corresponding to the first line button of that station registered in a temporary register internal to processor 300, logic circuit 7–4 in the processor can now determine what lamp and ring data should be generated for this line. Let it be assumed, for example, that key button 2, the first line button on station 200, which key button pertains to line L13, is presently "picked up" at station 200 and that the line is in the talking condition. Logic circuitry 7–4 determines that the lamp information for key button 2 at station 200 should cause the lamp under the key button to be illuminated at a rate indicative of the talking condition. A lamp bit corresponding to this data is generated by the logic circuitry and stored in a processor output register, not shown, to be subsequently transmitted to station package 216.

On the other hand, had the information in the line activity word indicated that line L13 was idle but the information obtained by sampling line package 213 now indicates that the line is ringing, logic circuitry 7–4 updates the line activity word, FIG. 5, and generates lamp-and-ring information for the processor's output register to indicate that the lamp under key button 2 should be illuminated at the flashing rate and the station's ringer should be turned on according to a specified ring rate indicative of the ringing condition. This portion of processor operation during which the station translation word is read and station activity and line activity are analyzed and information is obtained from the line package is called lamp-and-ring update.

Another example of processing that may be accomplished during lamp-and-ring update obtains when the information in the line activity word provided to the processor indicates that the line was being held by station 200 (or any other station having access to this line) but the information provided from the line package on the BUSY/IDLE lead indicates an idle line condition. Under these circumstances a hold abandoned condition exists and logic 7–4 changes the line activity word for the line from hold to idle. Thus, during lamp-and-ring update, the information in the line activity word may be changed depending upon the status information provided by the line package located via the translation mapping from the station translation word. Later on, during a subsequent interval called store update, the information in the line and station activity words will be updated dependent upon the conditions dictated by the state of the station set.

After the first line button information byte has successfully been transferred to the internal registers of the processor and the appropriate information generated to the processor's output register, the processor logic 7–6 causes the next line or service button information byte in the station translation word to be read. Appropriate lamp-and-ring information corresponding to the line or service assigned to the button is generated and stored in a processor output register in similar fashion.

After the last line button or service button information byte has been transferred to the processor and the processor has loaded the output register with the appropriate lamp-and-ring information bits, logic 7–6 enables logic 7–9 to shift the contents of the processor's output register out over the data send and data send bar leads, FIG. 2A, to the data transceiver at the station package, FIG. 2B. The processor uses the station equipment number from byte 4–1 to select and enable the station select lead of station package 216 corresponding to station set 200. Data transceiver 201 in the station package relays the lamp-and-ring information bits to the station set 200.

The first bit of data incoming to station set 200 causes station set 200 to return to transceiver 201 a bit of data reflecting its condition. As the successive bits of data are received by station set 200, the set provides logic 7-10 processor bits which indicate whether the station set desires dial tone recall, what the switchhook state of the station set is and which button, if any, of the station set has been depressed.

Processor 300 logic 7–10 receives the station set data applied over the data receive and data receive bar leads and stores the information in its internal processing registers. The information received in these registers is compared by logic 7–12 with the information stored in the station activity word (FIG. 5). If the comparison reveals that no changes have occurred and the station set is in the proper state (connected or not connected) the processor is instructed to read the translation word for the next station and the operations just described with respect to the translation word of FIG. 4 are repeated for the next station.

If logic 7–12 determines by comparing the information returned by station set 200 with the information stored in station activity word, FIG. 5, that changes have been made in the station set or that the station is not in the correct state, the station activity word is updated by logic 7–13 and/or a network function is performed. If any changes have been made such as the station user having depressed a line button, logic 7–13 updates the line activity word corresponding to the line button.

Figure 3:
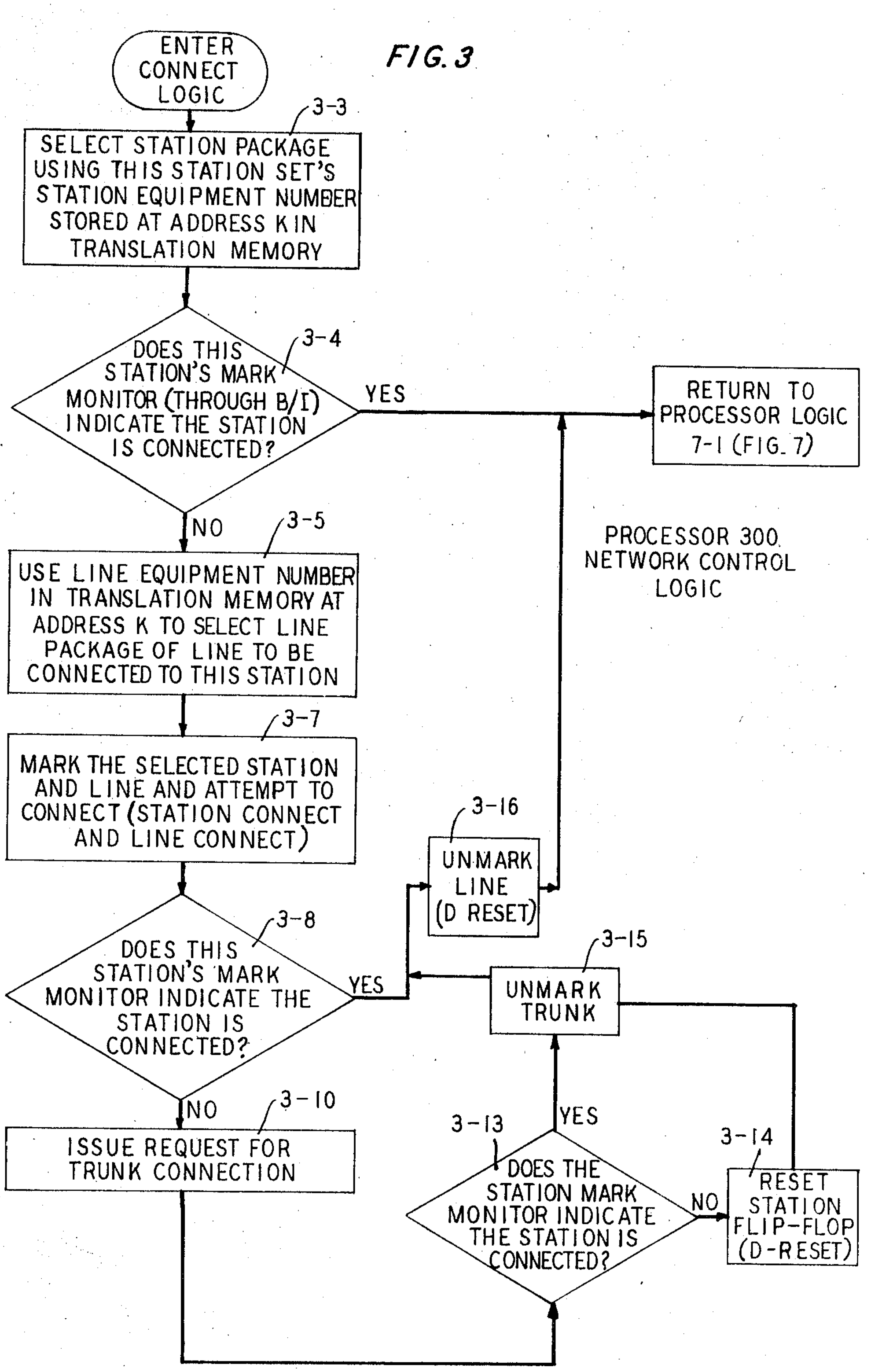
FIG. 3 shows the network control logic for the connection routine of the processor of this specific embodiment of the invention.

If station 200 had previously been idle but now indicates that it is off hook and has operated the key button corresponding to line L13, logic 7–13, after updating station and line activity words, FIGS. 5 and 6, respectively, activates logic 7–14 to energize the connect routine logic, FIG. 3. This logic controls the operation of the cross points in network 11 to effect an interconnection of station 200 with line L13.

If on the other hand, logic 7–12 had determined that station 200 had priorly been connected to line L13 in the talking state, but that now station 200 is on hook with respect to line 13, logic 7–13 updates the station activity word, FIG. 5, for station 200 to reflect the on hook condition, and the station would be disconnected from line 13 by network control logic, FIG. 2A. However, the entire line activity word for line 13 cannot at this time be reset to indicate the on-hook or idle condition because it cannot be ascertained from the information now in the processor whether line L13 may be connected to some other station.

SYSTEM CYCLE LOGIC — FIG. 8

In accordance with the invention described in the copending application of L. P. Fabiano, Jr. Case 2, Ser. No. 35,435 filed of even date herewith, the resetting of the line activity word 6–1 is governed by processor 300 in such a manner that the line activity word is reset only when all stations having access to that line have indicated that they are disconnected therefrom. For this purpose the primary line store word, FIG. 6, for each line contains a special line activity phase bit. The manner in which the phase bit is employed by the processor will now be described.

Figure 8:
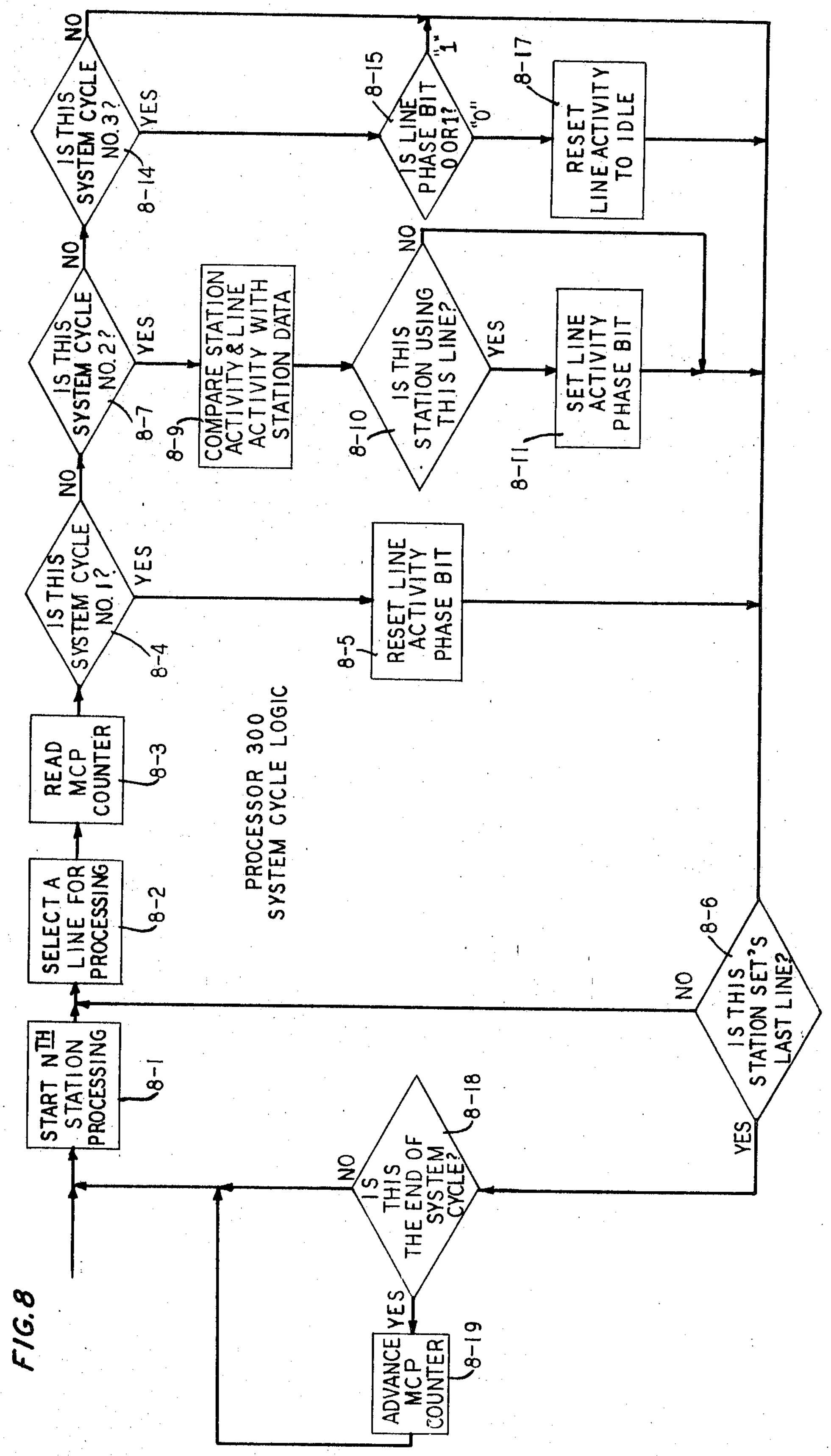
FIG. 8 shows the system cycle logic of the processor for clearing (i.e., resetting to idle) the line activity word in the binary line store (FIG. 6) for this specific embodiment.

The processor uses a two-stage counter (MCP), FIG. 8, to define three system phases: phase one, two and three. This phase counter is incremented each time the processor completes one processing cycle (i.e., each time all the stations have been processed). As lines are processed during phase one, their respective phase bits are reset by the processor 300 logic. At the end of this processing phase, the phase counter is advanced to phase two. During phase two all lines which have stations using them have their respective phase bits set. At the end of this phase the phase counter is again advanced. During phase three, and as all lines are processed, those which have their line activity phase bits reset will have their corresponding line activities cleared to idle. At the end of phase three the phase counter is reset to phase one and the process repeats.

With respect to a particular station and its lines, the processing technique is as follows. The processor accesses a station's translation word for the station in the manner previously described (see FIG. 4). Assuming the station contains all line buttons, the first line associated with the station is selected by logic 8–2 for processing. The state of the phase counter is then sensed. Assuming the counter state is phase one, the line activity phase bit for the selected line is reset by logic 8–5. Next logic 8–6 determines, for example, from logic 7–6 whether the line being processed is the last line in the station set's translation word. If the line being processed is not the station's last line, logic 8–6 causes logic 8-2 to select the next line in that station's translation word for processing. Accordingly, the significance of system phase 1 is to reset the line activity phase bit the first time a line is selected for processing so that the primary line store word will contain a logical 0 in phase bit 6–2. When all the lines for a station set have been processed once, logic 8–6 activates logic 8–18. Logic 8–18 determines whether the last station's translation word, FIG. 4, in memory has been accessed. If not, logic 8–18 activates logic 8–1 to access the next station's translation word. After all the station's translation words have been accessed one time, logic 8–18 determines when the last translation word (corresponding to the last station) in memory has been read and logic 8–18 activates logic 8–19 to advance the count in the phase counter (MCP) to 2. At this time, logic 8–1 is activated to access the first translation word, FIG. 4, in memory.

Assuming that the count accruing in the phase counter has been determined by logic 8–4 to indicate a count other than phase 1, logic 8–7 determines whether the count indicates the system is in phase 2. If the system is in phase 2, logic 8–7 instructs logic 8–9 to use the data in the station activity word, FIG. 5, to determine whether the station being processed by processing logic 8–1 is in fact using the line selected for processing by logic 8–2. If the line is in use by this station, logic 8–11 sets the line activity phase bit 6–2 to logical 1. Next logic 8–6 again checks whether the line being processed is the last line of the station. Assuming that it is not, logic 8–6 causes logic 8–2 to select another line for processing and operations proceed as previously described. Accordingly, during the second system phase, the line activity phase bit 6–2 is set to logical 1 if the line is in use by the station being processed.

If logic 8–6 determines that the line being processed is the last line in the station translation word, FIG. 4, for the station, it activates logic 8–18 to determine whether the translation word, FIG. 4, is the last translation word in memory. If it is not, logic 8–18 activates logic 8–1 to select the translation word for the next station. If logic 8–18 determines that the last translation word in memory has not been accessed for the second time, it activates logic 8–19 to increment the count in the phase counter to 3. Thereafter logic 8–1 is activated to once again access the first station's translation word in memory.

If logic 8–4 and logic 8–7 have determined that the system is neither in phase 1 or in phase 2 and logic 8–14 determines from phase counter (MCP) that the system is in phase 3, logic 8–15 reads phase bit 6–2. If the phase bit is logical 0, logic 8–15 activates logic 8–17 to reset the line activity word 6–1 to idle for the line being processed. The line activity word may properly be reset to 0 because during system phase 2 all of the stations at which this line appears had been accessed, and if any station had had this line in use, the phase bit 6–2 would have been set by logic 8–11. Since a phase bit which remains reset to 0 at the conclusion of the second system phase indicates a line that is not in use by any station, the remainder of the line activity word 6–1 may properly be reset to 0 by logic 8–17 during the third system phase. If, however, logic 8–15 determines that the phase bit is logical 1, it means that some station other than the station being processed was using that line during the preceding second system phase 1. Accordingly, logic 8–15 does not activate the reset logic 8–17 but instead activates logic 8–6. Logic 8–6 determines as before whether the line being processed is the last one for the station and operations similar to those described which take place dependent upon the decisions made by logic 8–6 occur again.

NETWORK CONNECTION CONTROL — FIG. 3

It will be recalled that processor 300 logic 7–14 passes control to the network connect logic of FIG. 3 after logic 7–12 has compared station data with the station activity word to detect a station dictated change and logic 7–14 indicates that a line-to-station connection is required. As mentioned previously, the network control logic of FIG. 3 has been simplified, in accordance with the principles of the present invention, by omitting from processor 300 memory unit any need to store a network map listing which stations are connectable to which lines. The manner in which network control is exercised without need of network map will now be described in connection with the processor 300 network control logic for connections shown in FIG. 3 and the apparatus of FIGS. 1 and 2. In FIG. 3, logic 3-3 is called into operation by decision logic 7–14 when the time comes and the need arises to perform line-to-station connections. Decision logic 7–14 determines whether the station's translation word being accessed is involved in a station-to-line connection. If not, logic 7–14 returns control to logic 7–1.

Assuming that logic 7–14 determines that a station-to-line connection is required, logic 3—3 is activated to select the station package 216 STA.SEL. lead in FIGS. 1 and 2. The location of the STA.SEL. lead is identified to processor 300 by using the station's equipment number in byte 4–1 of the station's translation word. Next logic 3–4 ascertains whether the station is busy or idle by monitoring the state of station package 216's station B/I lead in FIGS. 1 and 2. If the station is busy, the connection has been made previously and logic 3–4 passes control back to logic 7–1. Assuming that the station B/I lead indicates that the station is not busy, logic 3–4 activates logic 3–5. Logic 3–5 uses the line equipment number for the line which has been indicated to the processor as requiring a connection to the station being processed, and accesses the line SEL lead for the line package 213 corresponding to this line in FIGS. 1 and 2. When logic 3–5 has accessed the line SEL lead, logic 3–7 activates the line connect lead for the accessed line package.

It should be noted that contrary to other telephone systems having a central switching network, it is desired to permit a station user to obtain access to a "busy" line, rather than to prevent such access. This arises because of the close community of interest existing among key telephone station users who, more often than other telephone customers, have need to bridge onto existing connections. Accordingly, it is not necessary for processor 300 to sample the state of line package 213's busy/idle lead at this time. Energization of the line connect lead of line package 213 during the interval that the line select lead is activated enables AND-gate 220 which sets connect flip-flop C 221 and also sets D flip-flop 222. D flip-flop 222 in the set condition applies a signal to lead LD–13 associated with a row of gate electrodes of cross-point switching devices in switching array 11. The potential on lead LD–13 enables the gates in the row which gates include the gate electrode of cross-point 1316.

Simultaneously, logic 3–7 energizes the STA.SEL. and Station Connect leads to station package 216. These energized leads enable AND-gate 207 which in turn sets station mark SM flip-flop 240. The "1" output of the SM flip-flop 240 turns on transistor Q1 in mark monitor circuit 210. Transistor Q1 in the on condition provides, through its emitter-collector path a current sink for the column of cross-points in cross-point array 11 associated with column conductor N16 that is assigned to station package 216.

The manner in which transistor Q1 operates will now be explained in detail. Transistor Q1 when initially turned on goes into saturation since the positive potential provided by the "1" output of station mark SM flip-flop 240 together with the high impedance source 241 provide very little emitter current through Q1. With Q1 saturated the potential of its collector is only slightly above ground potential and Q1 provides a low-impedance ground to conductor N16. The low-impedance ground on conductor N16 together with the positive pulse applied on lead LD–13 by the D flip-flop of the line circuit 213 allows the cross-point 1316 to fire. After the cross-point fires, however, the potential of lead N16 approaches that of positive bias circuit 223. The higher potential now appearing on lead N16 combined with the fixed bias provided at the base of transistor Q1 by the "1" output of SM flip-flop 240 causes transistor Q1 to enter its constant current zone of operation. Transistor Q1 operating in its constant current mode presents a high impedance to conductor N16. Accordingly, any changes in the potential of lead N16 will not affect the current into transistor Q1. Accordingly, the audio current in conductor N16 will not be attenuated by any shunt path through Q1 so long as Q1 is maintained in its constant current mode.

When station set 200 associated with station package 216 is in the off-hook condition, audio signals passing through the cross-point are provided with a continuous path which may be traced from conductor N16, through the right-hand winding of transformer T2, lead ST, the off-hook station set 200, lead SR, the left-hand winding of transformer T2 and the emitter collector path of transistor Q3 to ground. Transistor Q3 will have been put in the conducting state by the set condition of station mark SM flip-flop 240.

With the cross-point 1316 enabled at its gate electrode and provided with a positive bias at one of its input terminals by positive bias circuit 223 in line package 213, a talking path is provided from line transformer T1 in the line package to the station transformer T2 in station package 216. The station user at station set 200 may then converse with the party connected at the tip and ring conductors.

Assuming that cross-point 13 has been fired, the increased potential on lead N16 which gives rise to the constant current mode of operation of transistor Q1 will cause sufficient voltage drop across resistor 242 to turn on transistor Q2. Transistor Q2 in the on condition lowers the potential on mark monitor lead MM. The lower potential on mark monitor lead MM will prevent AND gate 211 from being enabled when the D-reset lead is activated by processor 300 at the end of each station scan. The nonactivation of gate 211 will prevent the station mark SM flip-flop 240 from being reset and so its "1" output will remain high. The high signal at the "1" output enables gate 206, maintains Q1 on and maintains transistor Q3 on by back biasing diode D1. When processor 300 next enables the STA.SEL. lead, the output on the station B/I lead at the output of enabled gate 206 will indicate to the processor that a connection path has been established for station package 216 through network 11.

If, however, for any reason whatever, it had not been possible to establish a network path for station package 216, transistor Q2 in mark monitor circuit 210 would not be turned on. D-reset gate 211 would therefore not be inhibited and, when processor 300 next applied a D-reset signal to the D-reset lead, station mark SM flip-flop 240 would be reset. With flip-flop 240 reset, B/I gate 206 would not be enabled and processor 300 would not receive a signal on the station B/I lead representing the successful establishment of a network path.

If the signal on the station B/I lead indicates that a network connection has been established, logic 3–8 activates logic 3–16 to remove the line connect signal from the line connect lead to line package 213. Processor 300 subsequently energizes the D-reset lead to reset D flip-flop 222. However, cross-point 1316 continues to remain energized so long as the station is "off hook" with respect to the line. At this time, logic 3–16 activates logic 7–1 to continue the remaining processing routines.

If processor 300 does not receive a signal indicating a successful network connection on the station B/I lead after the processor had marked the line and station connect leads, logic 3–8 enables logic 3–10. Logic 3–10 applies a signal to the trunk request lead FIG. 1 to trunk control circuit 31. Trunk control circuit 31 may advantageously comprise a plurality of gates and flip-flops arranged in a sequential walking circuit configuration which applies an activating output signal on a successive one of leads TRK.1 SEL. through TRK.K SEL. each time the processor applies a signal to the trunk request lead. Logic 3–10 is provided, in accordance with the principles of the present invention, to initiate a request to the trunk control circuit 31 of FIG. 1 so that an idle one of trunk paths 25, 26, or 27 may be selected to complete the previously attempted connection. The signal applied on the particular TRK.1 SEL. through TRK.K SEL. output lead of trunk control circuit 31 enables a corresponding one of trunk packages 1 through K.

When one of these trunk packages is selected and is in the idle condition, it applies a cross point gating signal to its TD-lead to energize a row of cross point gate electrodes. For example, if trunk package 2 is selected by trunk control 31 and trunk package 2 is idle, a cross point gate enabling pulse will be applied to lead TD–2.

When the processor issues the trunk request to trunk control 31, the line package and station package between which connections are desired to be established will have been marked by logic 3–7 as previously described. This marked condition will obtain until a D-reset signal is generated by processor 300 at the end of the time allowed for the connection attempt. If the connection was successful, logic 3–15 and 3–16 are activated and unmark the line and trunk D-leads. If unsuccessful, logic 3–14 indicates the resetting of the station flip-flop 240 by the D-reset signal and a high MM lead, and logic 3–15 and 3–16 reset the mark conditions so that the next time this station is processed a new connection attempt will be made with a new trunk selected by logic 3–1.

Let it be assumed, for example, that the processor had previously been unable to effect a connection between line package 1 and station package *m* for which no direct cross-point is provided in network 11, FIG. 1. Let it be further assumed that trunk package 2 will be selected by trunk control 31 and that line package 1 and station package *m* are again marked by the processor. The marking of line package 1 by the processor causes a cross-point gate enabling pulse to be applied to lead LD–13. The selection of trunk package 2, assuming this trunk package to be at idle condition, causes a cross-point gate enabling pulse to be applied to lead TD–2. Accordingly, cross-points 26–1 and 26–4 have enabling pulses applied to their gate electrodes. The selection of station package *m* by the processor provides a ground path to lead N20 to fire cross-points 26–1 and 26–4 in series in similar fashion to the manner in which the single cross-point 1316 was fired in the above-described connection between line package 213 and station package 216. When cross-points 26–1 and 26–4 are operated, station package *m* will return a signal on the station B/I,*m* lead to processor 300 informing the processor of the successful network connection.

If, however, trunk control 31 had selected a trunk package which was in use on another network connection its B/I detector circuit would have responded to the potential on its respective one of leads 25, 26, or 27 and prevent the selected trunk package from applying a cross-point gate enabling pulse to its respective TD-lead. Under these circumstances, the station package that was marked would not return a busy (i.e., connected) signal on its station B/I lead to processor 300 and processor logic 3–13 would detect this fact and logic 3–14 would unmark the station. Another attempt to connect the station would be made the next time it is process.

CONCLUSION

Thus, in accordance with the present invention, processor 300 was not required to be provided with a network map in memory for identifying which horizontal conductor L13 through L19 were equipped with direct cross-points in network 11 to vertical conductors N16, N17 or N20. Further, the processor was not provided with a status memory indicating which ones of trunk paths 25, 26, or 27 were available at any particular time. Nevertheless, without such network map or trunk status information, switching network paths are provided; on an immediate basis when a direct network cross-point existed and on a trunk basis when no direct network cross-point was provided. Thus, the present invention offers the telephone company the opportunity of allowing a key telephone customer to be provided with direct network cross-points on an initial installation for the bulk of his lines and stations. If such a customer requires a peculiar interconnection of any of the stations with a telephone line in a consecutive group, this can be provided without need for custom wiring by the automatic manner in which processor logic 3–1 through 3–16 controls the switching network. No physical rewiring at the customer's premises is required.

Figure 7:
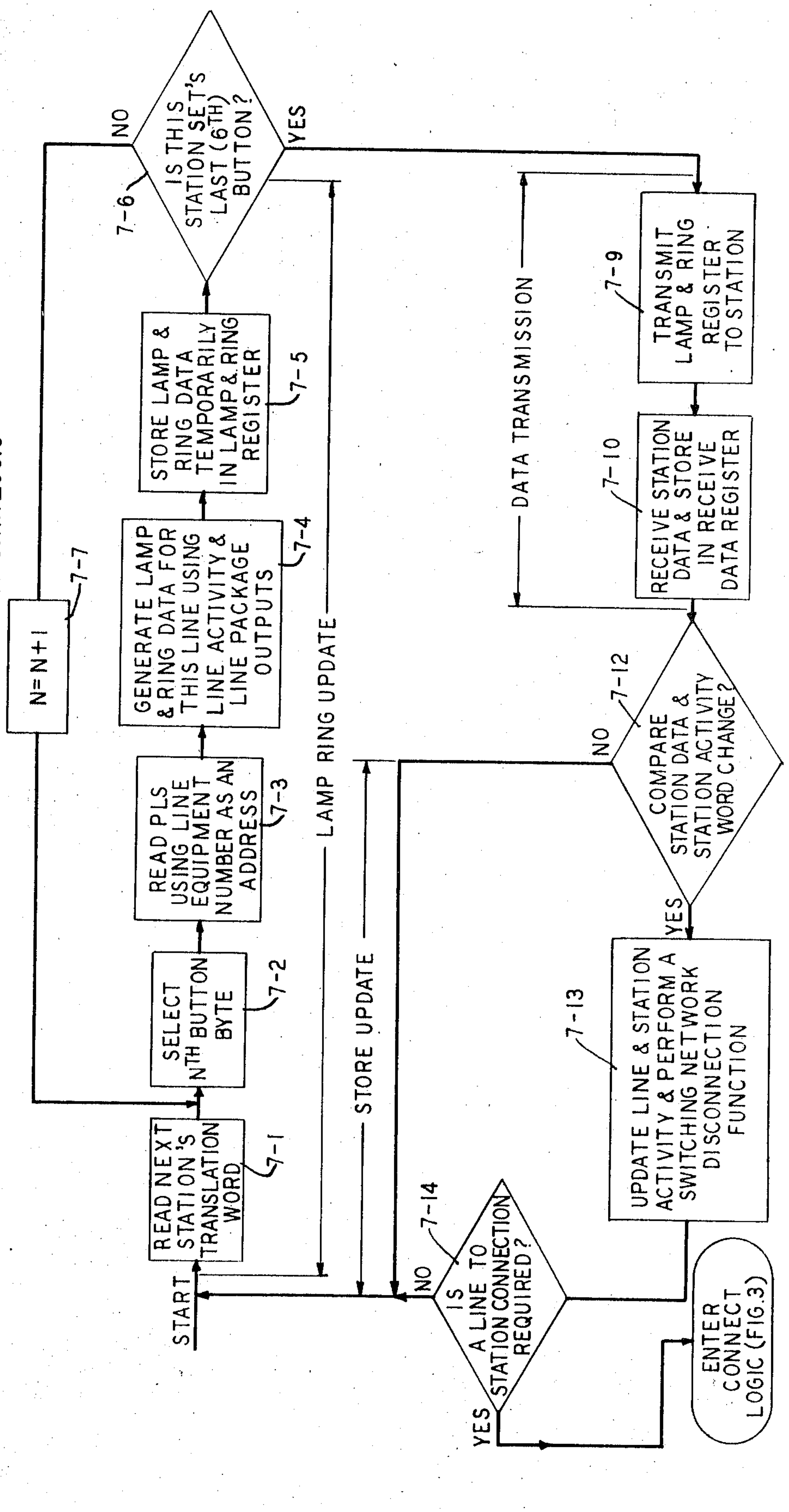
FIG. 7 shows the lamp and ring update, the data transmission and the store update logic of the processor of this specific embodiment.

For the purpose of simplifying the description of the key telephone system of the present invention various of the special services which can be provided by connecting station packages through the cross-point array with special service circuits have not been described. It will be apparent, however, that by providing such circuits with an appearance in cross-point array 11 and by recording the equipment location of that appearance in the service byte of the station translation word that numerous types of special services may be conveniently provided in similar fashion to the way in which a line is connected to a station. Also, it will be apparent that processor 300 system cycle logic, network control logic and update and transmission logic as represented in FIG. 2A and in FIGS. 8, 3, and 7, respectively, may be implemented either through the use of wired logic or program-controlled devices. Further and other variations for alternative embodiments will be apparent to those skilled in the art without departing from the spirit and scope of our invention.

What is claimed is:

1. A telephone switching system having a plurality of key telephone station sets and telephone lines comprising a switching network having direct cross-points for interconnecting certain of said station sets and telephone lines,
  - a plurality of trunks each equipped with network cross-points for lines and stations not having an interconnecting one of said direct cross-points in said network,
  - network control means operable normally to select and operate the cross-point at the intersection of a desired line and station in said network,
  - means for detecting when no cross-point is operated at said intersection, and
  - means controlled by said detecting means for selecting one of said plurality of trunks to interconnect said desired one of said telephone stations and telephone lines.

2. A telephone switching system according to claim 1 wherein said network control means is normally effective to select said cross point by marking said desired line and said desired station, wherein each of said trunks is equipped with a pair of cross points, and wherein said means for selecting said one of said trunks includes means for marking one of said pair of cross points with which one of said plurality of trunks is equipped.

3. A telephone switching system according to claim 2 wherein said means controlled by said detecting means further includes means for reoperating said network control means to mark the other of said pair of network cross-points with which said plurality of trunks is equipped.

4. A telephone switching system according to claim 3 wherein said network control means includes a transistor circuit for providing an enabling current path to a cross point in said network, means for biasing said transistor to the saturated state before said cross point is operated, and means for biasing said transistor to the constant-current state after said cross-point operates.

5. A key telephone system including a plurality of key telephone station sets, telephone lines, a switching network in which said sets and lines are given appearances, a plurality of cross points in said network for interconnecting certain of said sets and lines, a processor for controlling said network, and a trunk path having a cross point appearance for each line and station in said network, said processor having:
  - first logic means operable to mark one of said station sets and one of said lines' appearances in said network when a line and station are to be interconnected,
  - second logic means operable to monitor cross point current after said marking, and
  - third logic means operable to simultaneously mark said line, station set and trunk appearances when said monitoring indicates no cross-point current following said first-mentioned marking.

6. A key telephone system according to claim 5 wherein said processor includes further logic means operable to monitor said cross-point current after said line and said station and said trunk marking to ascertain whether a cross point connection has been effected in said switching network.

7. A key telephone system according to claim 5 wherein said processor includes further logic means for removing said line and said station marking responsive to said monitor logic means detecting said cross-point current flowing.

8. A telephone switching system comprising a plurality of lines,
  - a plurality of stations,
  - a plurality of current conductable cross-point connecting means fewer in number than the minimum number capable of connecting each of said lines with any of said stations,
  - control means for controlling said connecting means to connect a designated station to a designated line,
  - means for detecting failure of current flow through any cross-point between said designated station and line incident to said control means failing to establish the connection between said designated station and said designated line, and
  - means controlled by said detecting means for establishing an alternate connection between said designated station and said designated line independent of said plurality of connecting means.

9. A telephone switching system in accordance with claim 8 wherein said means for establishing said alternate connection includes trunk means and cross point means interconnecting said trunk means to said stations and said lines.

10. A telephone switching system in accordance with claim 9 wherein said means for establishing said alternate connection includes trunk means, cross point means operable for interconnecting said trunk means with said stations and said lines, and means for simultaneously causing said control means to attempt to establish a connection between said designated station and said designated line and for operating said last-mentioned cross-point means to connect said designated line and said designated station to said trunk means.

11. A key telephone system including a plurality of line packages, a plurality of station packages, network means including cross-points for interconnecting certain of said line and station packages, separate connecting means including cross-points connected to each of said line and station packages, and means responsive to said network means attempting but failing to establish a connection between one of said line packages and one of said station packages for establishing a connection between said one line package and said one station package by said separate connecting means.

12. A key telephone system in accordance with claim 11 further including means for marking said network means to cause one of said network means cross points to establish a connection through said network means between said one line package and said one station package, said means for establishing said connection by said separate connecting means including additional means for simultaneously marking said separate connecting means cross-points and said network means cross-points.

13. A key telephone system in accordance with claim 12 wherein said means for establishing said connection by said separate connecting means includes means for detecting the absence of current flow through said network means between said one line package and said one station package.

14. In a telephone system, a plurality of line packages and a plurality of station packages, network means including cross-points for establishing connections between certain of said line packages and said station packages, and means responsive to the attempt to establish a connection by a nonexistent cross-point between a particular station package and a particular line package for establishing a distinct connection between said particular station package and said particular line package, said last mentioned means including trunk means including cross points connected to each of said station packages and line packages.

* * * * *